Aug. 7, 1956  J. M. JOHNSTON  2,757,706
APPARATUS AND METHOD FOR FORMING SEAMLESS FLEXIBLE TUBING
Filed May 9, 1951  3 Sheets-Sheet 1
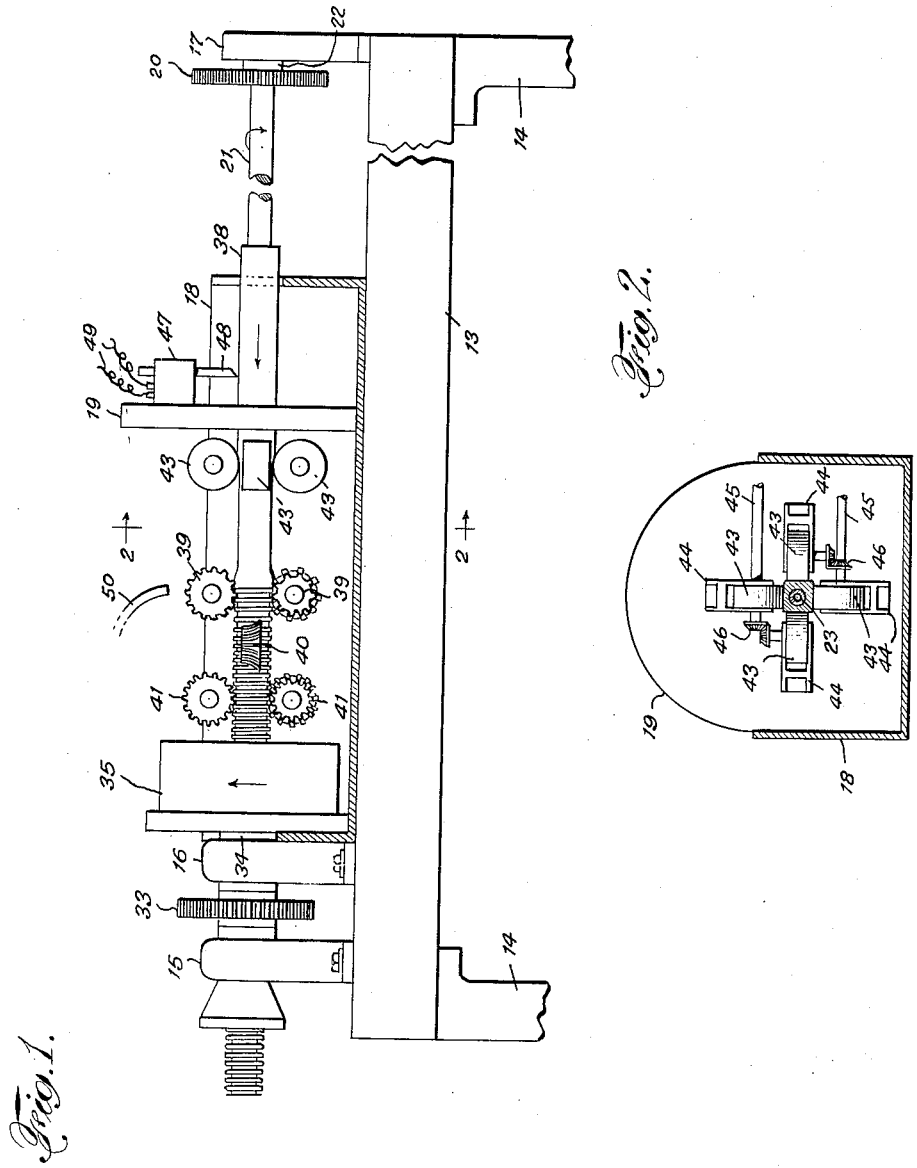
INVENTOR
John M. Johnston
BY
Emery, Varney, Whittemore & Dix
ATTORNEYS.

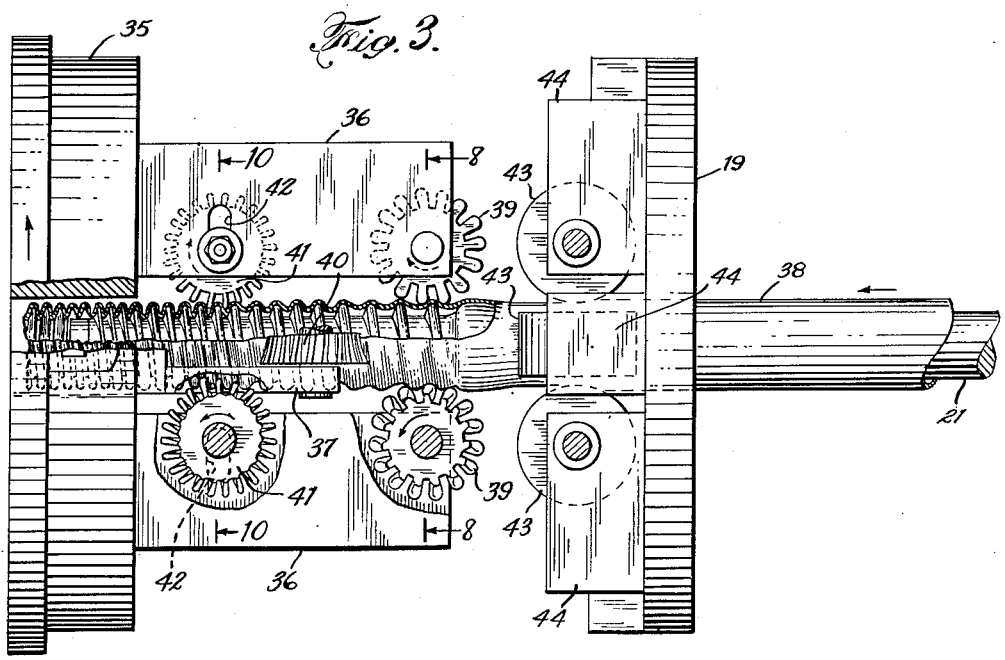
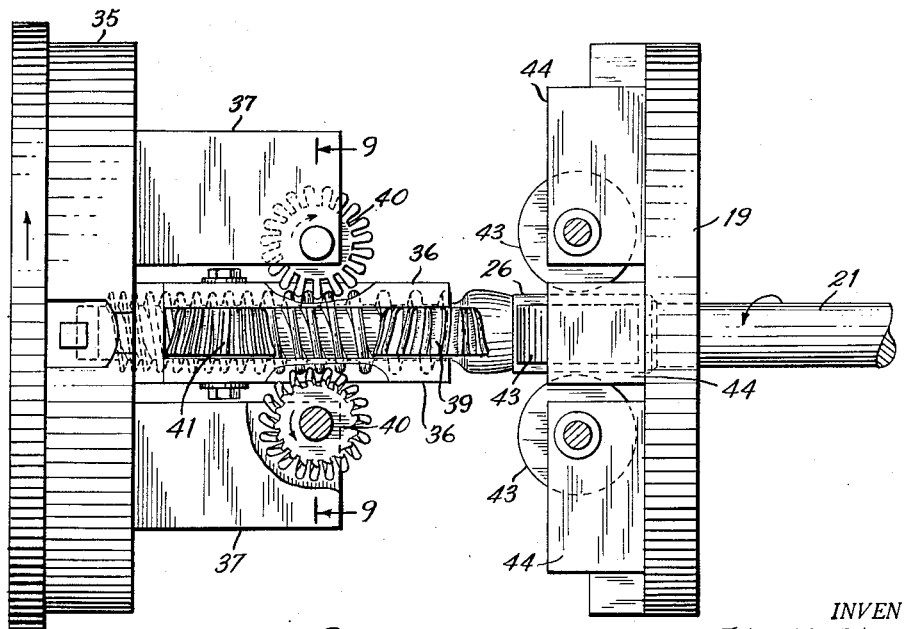

Aug. 7, 1956 J. M. JOHNSTON 2,757,706
APPARATUS AND METHOD FOR FORMING SEAMLESS FLEXIBLE TUBING
Filed May 9, 1951 3 Sheets-Sheet 3
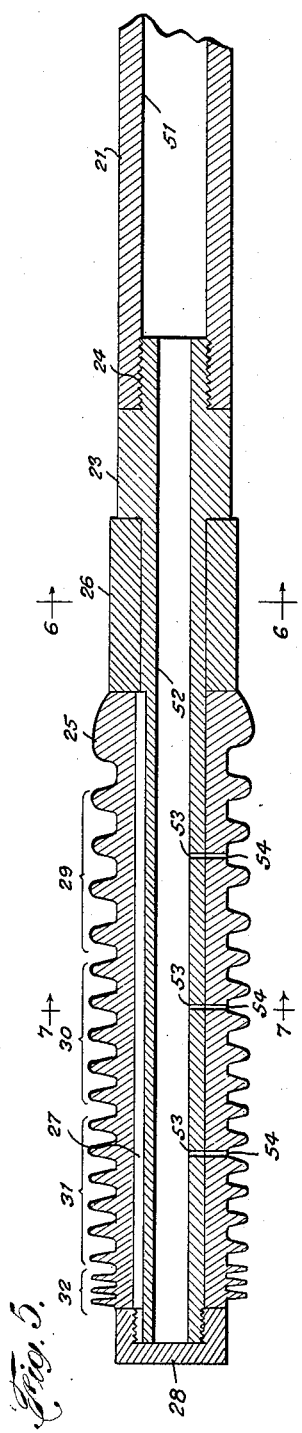
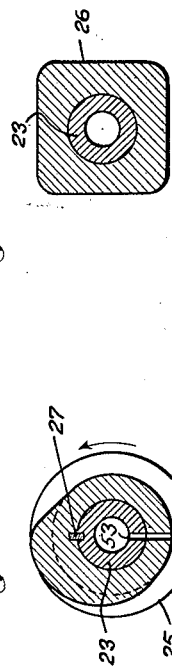
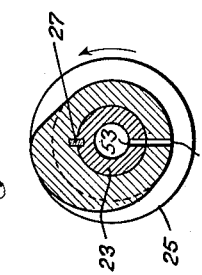
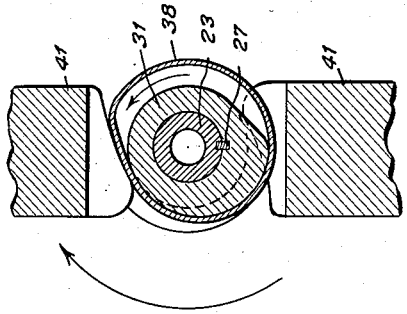
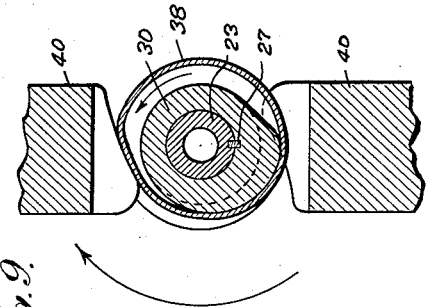
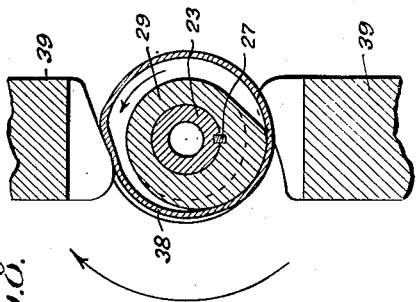
INVENTOR
John M. Johnston
BY
Emery, Varney, Whittemore & Dix
ATTORNEYS.

United States Patent Office 2,757,706
Patented Aug. 7, 1956

2,757,706

APPARATUS AND METHOD FOR FORMING SEAMLESS FLEXIBLE TUBING

John M. Johnston, Hillside, N. J.

Application May 9, 1951, Serial No. 225,406

15 Claims. (Cl. 153—72)

This invention relates to apparatus and method for the manufacture of seamless, flexible, metal tubing or hose. More particularly the invention relates to improvements in apparatus used for forming helical convolutions or corrugations in straight-walled ductile tubing, and to improvements in the method of manufacturing helically convoluted flexible tubing.

The apparatus and method of the present invention represent an advance over the apparatus and method of my copending application, Serial No. 216,634, filed March 20, 1951, now Patent No. 2,714,919, issued August 9, 1955, and are particularly suited for the manufacture of seamless flexible tubing of diameter greater than about three-quarters of an inch, and for the manufacture of seamless flexible tubing from straight-walled tubing having walls thicker than about 0.01 inch.

It has been proposed heretofore to form helical convolutions in straight-walled tubing of ductile metal by rolling helical grooves in the tubing wall. Various shapes and arrangements of rollers, both internal and external to the tube, have been suggested in attempts to produce satisfactory tubing efficiently and economically. In those prior arrangements the axes of the rollers were parallel, or nearly parallel, to the axis of the metal tubing.

It also has been proposed to form helical convolutions in straight-walled metal tubing by feeding the tubing into a relatively rotating die-like structure having one or more groove-forming die plates providing a working surface arranged in a spiral helix for forming the helical corrugations in the tubing wall. Various die-like structures have been proposed for this purpose. These dies usually are of involved structural design and in many cases are incapable of accommodating readily or fully for normal slight variations in tube size or wall thickness such as may be encountered in actual operation. As a result, the characteristics of convoluted tubing produced by these dies were not uniform.

Many of these structures which have been proposed for forming helical convolutions in straight-walled metal tubing are difficult and costly to manufacture. Some of them twist or otherwise distort the tube being operated upon and produce unequal strains therein. Many of these devices are subject to excessive wear, with accompanying variation in the finished product and a high upkeep or replacement cost for the apparatus.

It is an object of this invention to provide improved apparatus and method suitable for forming helical convolutions or grooves in straight-walled tubing of ductile material. A further object of the invention is to provide apparatus of the character described which will produce seamless, flexible, metal tubing of uniform quality which is substantially free from distortion and unequal strains. Another object of the invention is to provide apparatus and method for forming helical convolutions in straight-walled tubing principally by pleating the wall of the tube and with a minimum drawing or elongation of the metal. Still another object of the invention is to provide apparatus of the character described in which adjustments, when necessary, may be easily made to produce corrugated tubing of high uniformity regardless of slight variations in the size or thickness of the straight-walled tubing. Other objects and advantages of the invention will appear hereinafter.

A preferred embodiment of the invention has been selected for purposes of illustration and is shown in the accompanying drawings, wherein:

Figure 1 is a side elevation of a tube corrugating machine, in somewhat diagrammatic form, showing a tube part way through the machine;

Figure 2 is a transverse vertical section through the machine of Figure 1, substantially on the line 2—2 of that figure, showing the mechanism for holding the tube against rotation and for feeding the tube onto the helically grooved worm;

Figure 3 is a side elevation, to enlarged scale as compared with Figure 1, of the forming head and die wheel mechanism which forms the helical groove in the tube, parts of the mechanism and a part of the tube wall being broken away to disclose the invention more clearly;

Figure 4 is a view similar to Figure 3, but with the groove-forming head rotated 90 degrees and with the tube removed from the machine;

Figure 5 is a longitudinal section through the worm, the spindle on which the worm is mounted and the end of the arbor to which the spindle is secured;

Figure 6 is a transverse section through the spindle substantially on the line 6—6 of Figure 5;

Figure 7 is a transverse section through the spindle and worm substantially on the line 7—7 of Figure 5;

Figures 8 and 10 are fragmentary vertical sections substantially on lines 8—8 and 10—10, respectively, of Figure 3, but to enlarged scale as compared with that figure, showing how the die wheels press the metal of the tube down into the groove of the worm as the tube progresses through the machine; and Figure 9 is a view similar to Figures 8 and 10, taken substantially on line 9—9 of Figure 4, showing a tube in the machine.

Referring first to Figure 1 of the drawings, 13 indicates the elongated base or frame of the machine, which is shown supported on standards 14. The base is provided with pedestals 15, 16 and 17 having aligned bearings in their upper ends. The pedestals 15 and 16 are spaced close to each other near one end of the base, the left-hand end as viewed in Figure 1, whereas the pedestal 17 is located at or near the other end of the base. The distance between pedestal 17 and the pedestals 15 and 16 is somewhat greater than the maximum initial length of the straight-walled tubes which are to be corrugated by the machine. The break in the base which appears near the right-hand side of Figure 1 is intended to indicate that the base is considerably longer than it is possible to show to scale on the drawing.

Also mounted on the base 13, adjacent the pedestal 16, is a tank 18 for catching lubricant desirably supplied to the worm and the groove-forming dies during the corrugating operation, as will be described more fully hereinafter.

Mounted transversely within the tank 18 is a standard 19 having an opening aligned with the bearings in the upper ends of the pedestals 15, 16 and 17. The standard 19 supports mechanism which holds the tube against rotation while simultaneously feeding the tube forward into the corrugating mechanism, all as will appear hereinafter.

Rotatably mounted in the bearing of pedestal 17 is a journal 22 to which is secured a suitable member by means of which the journal may be driven, for example a gear wheel 20. Suitable means, not shown, will be provided for driving the gear 20. Removably secured to the journal so as to turn therewith is one end of a long arbor 21 which preferably is tubular in form. The other end of this arbor extends through an opening in the end of the tank 18 to a point adjacent the standard 19.

In preparing the machine to make convoluted tubing the end of the arbor 21 will be disengaged from the journal 22 and moved slightly to the side to permit sliding a straight-walled tube onto the arbor. The end of the arbor will then be secured to the journal 22 again. In operation of the machine the straight-walled tube will be moved off from the other end of the arbor through the standard 19. The length of the arbor determines the maximum length of straight-walled tube which can be corrugated by the machine in one operation, the tube length being approximately equal to the arbor length. Obviously this may vary in different machines, depending partly on the diameter, thickness and material of the tube.

By reference to Figures 4 and 5 of the drawings it will be seen that there is secured to the end of the arbor 21, adjacent the standard 19, a spindle 23 which extends through the opening in the standard. This spindle constitutes a longitudinal extension of the arbor and preferably also is tubular in form. The spindle is attached to the arbor so as to rotate therewith, as by a screw-threaded connection 24 such as is shown in Figure 5. Rotatably mounted on a section of the spindle of reduced diameter is a square block 26 which cooperates with squaring rolls, hereinafter described, to hold the tube against rotation as it is moved through the machine during the corrugating operation.

Secured on the spindle 23, opposite the screw-threaded end connection 24, is a worm 25. This worm is secured to the spindle so as to rotate therewith and conveniently this may be accomplished by means of a key 27 inserted in matching keyways in the spindle and the worm. Suitable means are provided for holding the worm on the spindle, for example the end of the spindle may be externally screw-threaded to receive a cap nut 28 which holds the worm against longitudinal movement on the spindle and also closes the end of the bore of the tubular spindle.

In forming helically convoluted tubing by the machine of the present invention the tube, initially a straight-walled tube of internal diameter approximately equal to the outside diameter of the worm, will be moved in the direction of its longitudinal axis from its position on the arbor 21 over the worm and the material of the tube wall will be forced down into the groove of the worm by gear-like die wheels as hereinafter described. According to the present invention, the worm 25 has a forward end section 29 of substantially greater pitch than the pitch of the finished tubing, following by successive sections 30, 31 and 32 of progressively decreasing pitch. The term "pitch" as used herein in reference to the worm means the axial pitch, that is the distance measured parallel to the axis from one point on the helix to the corresponding point on the next turn. The forward end section is the end of the worm onto which the straight-walled tube is fed from the arbor.

Merely by way of example, in one machine which has been used for making helically convoluted copper tubing having a final inside diameter of approximately 1 1/16 inches and a final outside diameter of approximately 1 3/8 inches, the forward end section 29 of the worm is approximately one inch long and the pitch is 1/3 inch, and this section is followed by successive sections 30 and 31 of similar length in which the pitch is 1/4 inch and 1/5 inch, respectively, the final section 32 of the worm having merely three turns of progressively decreasing pitch to the final pitch of 1/8 inch. The straight-walled copper tube was approximately 30 feet long and 1 3/8 inches in outside diameter and the wall thickness was 0.015 inch. The convoluted tube was about 15 feet long. It will be understood that the number of sections of different pitch, the length of these sections, and the pitch of the worm in the different sections may vary depending, among other things, on the size and thickness of the tube and the material from which it is made.

The forming head and die wheel mechanism will now be described. Rotatably mounted in the bearings of pedestals 15 and 16 is a tubular journal 34 having secured thereto a suitable member by means of which the journal may be driven, for example a gear wheel 33. Suitable means, not shown, will be provided for driving the gear 33. The gears 20 and 33 will be driven in opposite directions, as indicated by the arrows on Figure 1. Conveniently these gears will turn at equal speeds, but the speed of gear 33 may exceed the speed of gear 20, if desired. The driving connections to the gears 20 and 33 will be such as to maintain a definite speed relation between the two driven journals 22 and 34 when the machine is in operation, but this speed relation may be made different for different sizes or thickness of tubing, or for tubes of different materials.

Secured to the end of the journal 34 which projects beyond the pedestal 16, so as to rotate with the journal, is a forming head or die carrier 35. This forming head carries the die wheels which, in cooperation with the worm, form the helical groove in the straight-walled ductile tube as the tube is moved lengthwise from the arbor 21 onto and over the worm 25. This forming head preferably is a chuck of suitable construction having mounted thereon a plurality of pairs of opposed, radially adjustable blocks 36 and 37. Rotatably mounted on these blocks are the groove-forming, gear-like die wheels 39, 40 and 41. Each of these gear-like die wheels is mounted on its block so as to be free to rotate about an axis at right angles, or substantially at right angles, to and displaced to one side of the axis of the worm 25.

In the illustrative embodiment there are two diametrically opposed gear-like die wheels 39 mounted near the outer ends of the blocks 36, on opposite sides of the forward end section 29 of the worm 25. Two diametrically opposed gear-like die wheels 40 are located on opposite sides of the section 30 of the worm. In order to provide a compact machine with adequate clearance between the die wheels 39 and the die wheels 40, the latter are mounted in the blocks 37, which are displaced 90 degrees circumferentially of the chuck from the blocks 36. Two diametrically opposed gear-like die wheels 41 are located on opposite sides of the section 31 of the worm and conveniently may be mounted in the blocks 36, located near the face of the forming head 35.

By adjustment of the blocks 36 and 37 radially in the forming head the gear-like die wheels 39, 40 and 41 may be moved toward or away from the worm 25 to bring the die wheels into meshing engagement with the worm with the desired clearances or backlash. Where a block has more than one die wheel mounted thereon, as do the block 36 in the illustrative embodiment, the die wheels should be relatively adjustable in the block, radially of the forming head. As shown in the illustrative embodiment, the axles for the die wheels 41 extend through slots 42 in the sides of the blocks 36 so as to permit adjustment of the die wheels 41 in the blocks 36, radially of the forming head. The axles may be secured in adjusted position in the slots, for example, by tightening a nut on the end of the axle against the side of the block 36.

The gear-like die wheels 39, 40 and 41 generally resemble the worm wheel of a worm and wheel gear, but are provided with special gear faces so that upon relative rotation between the forming head and the tubing the leading edges of the gear teeth, as the forming head rotates about the tubing and the worm, will not dig into the wall of the tube being processed. To this end the die wheels are made so that the leading edges of the gear teeth clear and ride over the tubing, and the trailing portions of the gear teeth engage and gradually press the material of the tube wall down into the groove of the worm. Each die wheel is generally frusto-conical in shape, but preferably has a concave circumferential periphery. This is clearly shown in the drawings.

Prior to passing a straight-walled tube through the machine the blocks 36 and 37 will be adjusted radially so that the teeth of the die wheels 39 and 40 mesh loosely with sections 29 and 30, respectively, of the worm 25, and the die wheels 41 will be adjusted in the blocks 36 so as to mesh loosely with section 31 of the worm. Preferably the radial adjustment of the die wheels 39 is such that the teeth of these die wheels will press the tube wall only part way down into the underlying groove of the worm, as is shown in Figures 3 and 8. The die wheels 40 are adjusted so as to press the tube wall deeper into the groove of the worm, as shown in Figures 3 and 9, and the die wheels 41 are adjusted to press the tube wall still deeper into the groove and even substantially to the bottom of the groove of the worm, as shown in Figures 3 and 10.

The teeth of these die wheels match the thread of the worm at their places of engagement with a considerable amount of backlash. Preferably the width of a die wheel tooth plus twice the thickness of the tube wall will be somewhat less than the width of the groove in the worm at the place of engagement. This fact, plus the fact that the tube wall is pressed progressively further down into the groove of the worm as it passes over the successive sections of the worm, results in forming the convolutions in the tube wall largely by a pleating or folding action and with a minimum drawing of the metal of the tube.

In operation, the die wheels 39 cooperate with the forward end section 29 of the worm to press the material of the tube wall part way down into the groove of the worm, thus initiating the helical pleating of the tube wall. The next set of die wheels 40 cooperates with section 30 of the worm to press the material of the tube wall farther into the groove of the worm, now of shortened pitch, thus continuing and advancing the pleating operation. The die wheels 41 cooperate with section 31 of the worm, of still shorter pitch, to press the material of the tube wall substantially down to the bottom of the groove of the worm. Thus, while the tube wall is supported on the inside along a narrow helically extending course of progressively decreasing pitch by the land of the worm, the unsupported portion of the tube wall is pressed downwardly a progressively greater distance as the pitch of the supporting course decreases.

Since the corrugations in the tube are formed primarily by a pleating operation and with a minimum drawing and working of the metal of the tube, the thickness of the wall of the corrugated tube is substantially uniform and exhibits relatively little variation from the original thickness of the straight-walled tube. Consequently the stresses and strains in the tube wall are kept to a minimum. By reason of this pleating operation there will be a material reduction in the over-all length of the tube as it passes through the machine, the length of the tube wall measured along its sinuous course in a longitudinal section through the convoluted tubing being not greatly different from the original length of the straight-walled tube.

Relative rotation between the worm and the tube causes the worm to feed the tube along its longitudinal axis by screw action. The final section 32 of the worm serves to compress the convoluted tube along its longitudinal axis by gradually closing up the spacing between the walls of adjacent turns. This is desirable because it increases the flexibility of the tube. After the convoluted tube has been removed from the machine it may be further compressed longitudinally, if desired, by conventional means.

Means for feeding the straight-walled tube from the arbor 21 onto the worm and for simultaneously holding the tube against rotation as it passes through the machine will next be described. In the illustrative embodiment the straight-walled tube is changed from round to roughly polygonal shape with rounded corners by mechanism which is fixed relative to the base 13. The polygonal-shaped tube is held against rotation about its axis by this mechanism, which simultaneously feeds the tube forward onto the worm.

Mounted on the standard 19, around the opening through which the straight-walled tube passes as it moves from the arbor 21 to the worm 25, are a plurality of flat faced rolls 43, four such rolls being shown. These rolls are equally spaced around the spindle 23 overlying the square block 26 and desirably are adjustable radially so as to accommodate the machine for different tube sizes and wall thicknesses. In the illustrative embodiment the rolls 43 are rotatably mounted in blocks 44 which are adjustable on the standard 19 radially of the spindle 23. These rolls will be adjusted so that the clearance between their faces and the flat surfaces of the square block 26 are slightly greater than the thickness of the tube wall. When the tube 38 is moved longitudinally along the arbor and passes between the rolls and the square block the tube shape is changed from round to substantially square. The block 26, being freely rotatable relative to the spindle 23, will be held against rotation by the rolls as the spindle turns and will hold the tube against rotation about its longitudinal axis.

As described hereinabove, relative rotation between the worm 25 and the tube moving thereover causes the tube to be fed longitudinally along the worm by screw action. Preferably means are provided for driving some or all of the rolls 43 to feed the tube onto the worm so as to reduce wear on the worm and the die wheels and to insure a more uniform product. Means for accomplishing this result are shown somewhat diagrammatically in Figure 2, where drive shafts 45 are connected directly to two of the rolls 43 and through gears 46 to the other two rolls. It will be understood that these driving connections desirably will be made so as to permit adjustment of the rolls radially with respect to the spindle 23.

Desirably the rolls 43 will be driven at a speed such that the peripheral speed of the rolls is slightly greater than the speed of the tube as it passes through the apparatus, so as to feed the tube to the worm with a slight positive pressure. Jamming or damage to the tube is prevented by slippage between the flat faces of the rolls and the surface of the tube wall.

Means may be provided to stop the machine, or to give a warning signal to the operator, or both, before the trailing end of the tube 38 clears the tube squaring device. Then the tube can be held against rotation by other means, as by gripping the convoluted end of the tube, while the last few inches of the tube pass over the worm. For example, an electric switch 47 may be mounted on the standard 19 and provided with an actuating pin 48, the lower end of which slidably engages the tube wall a short distance ahead of the rolls 43. When the end of the tube passes from under the pin 48 the switch 47 will be actuated and by means of suitable wiring connections 49 a signal can be given, or the machine stopped, or both.

It will be desirable to supply a lubricating liquid to the exterior of the tube as it passes under the gear-like die wheels so as to reduce the friction and minimize wear of the die wheels. Lubricating liquid can be supplied through a spout 50 located above the die wheels and discharging liquid directly on the die wheels 39, for example.

Desirably lubricating liquid also will be supplied between the worm and the tube to reduce the friction between the worm and the convoluted tube and to minimize wear of the worm. In the illustrative embodiment this can be done by forcing liquid under pressure longitudinally through the bore 51 of the arbor 21 and bore 52 of spindle 23 and thence outwardly through matching radial openings 53 and 54 in the walls of the spindle and the worm into the groove of the worm.

Claims to the gear-like die wheels and to the method of forming flexible convoluted tubing by means of gear-like die wheels and a worm are included in my co-pending application hereinabove identified.

The invention herein disclosed may be variously modified and embodied within the scope of the subjoined claims.

I claim:

1. Apparatus for forming helical convolutions in straight-walled ductile tubing comprising, in combination, a helically grooved worm over which a tube is to be fed by being moved along its longitudinal axis when that axis substantially coincides with the longitudinal axis of the worm, the outside diameter of the worm being approximately equal to the inside diameter of the tube, said worm having a forward end section of substantially greater pitch than the pitch of the finished tube, followed by successive sections of progressively decreasing pitch, means for holding the tube against rotation as it passes over the worm, a forming head surrounding the worm, means for rotating the forming head about the worm, a plurality of die wheels mounted on said forming head and overlying sections of the worm of different pitch in registry for forcing material of the tube wall down into the groove of the worm as the forming head rotates, and means for rotating the worm about its longitudinal axis to feed helically convoluted tubing formed thereon longitudinally along the worm.

2. Apparatus for forming helical convolutions in straight-walled ductile tubing according to claim 1, in which the forming head and the worm are rotated in opposite directions.

3. Apparatus for forming helical convolutions in straight-walled ductile tubing according to claim 1, in which the forming head and the worm are rotated in opposite directions at similar speeds.

4. Apparatus for forming helical convolutions in straight-walled ductile tubing according to claim 1, in which the means for holding the tube against rotation comprises means for feeding the tube on to the end of the worm.

5. Apparatus for forming helical convolutions in straight-walled ductile tubing according to claim 1, in which the means for holding the tube against rotation comprises a plurality of rolls arranged circumferentially around the tube, and means for driving the rolls to feed the tube onto the end of the worm.

6. Apparatus for forming helical convolutions in straight-walled ductile tubing according to claim 5, in which the rolls are flat faced and are located relative to each other and to the tube so as to change the shape of the tube as it passes therebetween.

7. Apparatus for forming helical convolutions in straight-walled ductile tubing comprising, in combination, a helically grooved worm over which a tube is to be fed by being moved along its longitudinal axis, said worm having a forward end section of substantially greater pitch than the pitch of the finished tube, followed by successive sections of progressively decreasing pitch, a forming head surrounding the worm, a plurality of die wheels rotatably mounted on said head overlying sections of the worm of different pitch in registry for forming a helical groove in the tube by forcing material of the tube wall down into the groove of the worm upon relative rotation between the forming head and the tube, means for relatively rotating the forming head about the worm and tube to cause the die wheels to form a helical groove in the tube, and means for simultaneously relatively rotating the tube and the worm to feed the convoluted tubing thus formed along the worm.

8. Apparatus for forming helical convolutions in straight-walled ductile tubing according to claim 7, comprising gear-like die wheels which force the material of the tube wall progressively further into the worm groove as the pitch of the worm decreases.

9. Apparatus for forming helical convolutions in straight-walled ductile tubing according to claim 7, comprising gear-like die wheels in which the circular pitch of the die wheels spaced longitudinally along the worm progressively decreases along the worm as the pitch of the worm decreases.

10. Apparatus for forming helical convolutions in straight-walled ductile tubing according to claim 7, comprising gear-like die wheels which are mounted to rotate about axes at right angles to and displaced to the side of the axis of the worm.

11. Apparatus for forming helical convolutions in straight-walled ductile tubing according to claim 7, comprising means for holding the tube against rotation, means for rotating the forming head about the tube in one direction, and means for rotating the worm in the opposite direction.

12. Apparatus for forming helical convolutions in straight-walled ductile tubing according to claim 7, comprising a plurality of rolls arranged circumferentially about the tube with their planes passing through the longitudinal axis of the tube, and means for driving the rolls to feed the tube on to the end of the worm.

13. In an apparatus for forming helical convolutions in straight-walled ductile tubing according to claim 12, said rolls having flat faces and being so located relative to each other and to the tube as to hold the tube against rotation as it passes therebetween.

14. The method of forming helical convolutions in round, straight-walled, ductile tubing which comprises continuously moving a tube in the direction of its longitudinal axis while holding the tube against rotation, supporting the moving tube wall on the inside along a narrow helically extending course of progressively decreasing pitch and pressing the tube wall on the outside inwardly a progressively greater distance as the pitch of the supporting course decreases.

15. The method of forming helical convolutions in round, straight-walled, ductile tubing which comprises continuously moving a tube in the direction of its longitudinal axis while holding the tube against rotation, supporting the moving tube wall on the inside along a narrow helically extending support of progressively decreasing pitch, rotating the helical support, and pressing the tube wall on the outside at right angles to its said direction of movement and in a direction opposite the direction of rotation of the helical support.

References Cited in the file of this patent

UNITED STATES PATENTS

| | | |
|---|---|---|
| 390,899 | Pratt et al. | Oct. 9, 1888 |
| 1,417,324 | Holmes | May 23, 1922 |
| 2,002,896 | Kopetz | May 28, 1935 |
| 2,559,191 | Hussnigg | July 3, 1951 |
| 2,617,335 | Bremer | Nov. 11, 1952 |